Oct. 13, 1959        R. T. STONE        2,908,442

METHOD FOR DISPERSING NATURAL ATMOSPHERIC FOGS AND CLOUDS

Filed Jan. 16, 1959

2,908,442

METHOD FOR DISPERSING NATURAL ATMOSPHERIC FOGS AND CLOUDS

Roger T. Stone, San Jose, Costa Rica, assignor to Fincas e Industrias Tiribi Ltda, San Jose, Costa Rica, a corporation of Costa Rica Application January 16, 1959, Serial No. 787,182

6 Claims. (Cl. 239—2)

The present invention relates to weather control and more particularly relates to a method of dispersing natural atmospheric fogs and clouds, as well as causing precipitation therefrom and is a continuation-in-part of my copending applications, Serial No. 372,278, filed August 4, 1953, now abandoned, and serial No. 410,295, filed February 15, 1954, now abandoned.

The dispersal of fogs and clouds and the causing of precipitation therefrom was heretofore known to be possible only under certain conditions, that is, under conditions in which the temperature of the water droplets or supercooled vapor in at least some part of the cloud or fog was below freezing. The two most well known of such methods for example, have employed in one instance solid carbon dioxide, and in the other silver iodide. Both of such methods have required, for their effective carrying out, the seeding of clouds at below freezing temperatures. Such is of little use particularly for dispersion of fogs and low clouds, since low lying clouds and particularly the fogs prevalent in coastal areas normally are above freezing.

I have discovered that many types of clouds and fogs may be dispersed or caused to precipitate artificially at temperatures well above freezing. Hence, for the first time, my novel method makes possible the dispersal of clouds and the producing of rain therefrom without the usual predetermined conditions, as well as the dispersal of warm fogs so common during certain seasons in coastal areas.

I have achieved this surprising result by dispersing into natural atmospheric clouds or fogs containing water in droplet or vapor form, minute quantities of a lower alcohol, preferably in dispersed form from a pressurized solution thereof in a low boiling point liquid-to-gas phase propellant for dispersing the alcohol, although the particular means for dispersal of the alcohol does not appear to be critical. I have further found it desirable so to introduce into the atmosphere itself an extended trail of the dispersed alcohol. For example, where it is desirable to introduce the alcohol well above the ground as to disperse clouds, such may be done by means of aircraft or even a fixed balloon or kite. For fog dispersal, an extended trail of dispersed alcohol may frequently be used either on the ground in the area to be freed of fog or to the windward of it depending upon the velocity of the wind. It has been noted that when atomized alcohol rises upon atomization, the dispersal of the fog is almost immediate.

The liquid-to-gas phase propellant may be any one of a number of low boiling point liquids capable of entering into solution with a lower alcohol. For example, I contemplate that the following may be used as my propellant: ammonia, carbon dioxide, sulfur dioxide, butane, isobutane, propane, methyl chloride, and the Freons such as dichlorodifluoromethane (F-12) and chlorodifluoromethane (F-22). All of these liquids have boiling points at normal atmospheric pressure of less than 0° C., have vapor pressures greater than normal atmospheric pressure, and dissolve lower alcohols. Such a liquid having alcohol dissolved therein may be maintained in its liquid state under pressure in a sealed pressure container, from which container the solution may be released to the atmosphere to disperse the alcohol together with the propellant, it being necessary for effective propelling action that the boiling point of the liquid phase of said liquid-to-gas phase propellant be less than the ambient air temperature and that the absolute pressure of the saturated vapor of said liquid phase at the prevailing ambient temperature be substantially greater than the ambient atmospheric pressure.

Although the precise reason for the peculiar effectiveness of lower alcohols, particularly methyl and ethyl alcohol, in dispersed form from a pressurized solution of a low boiling point liquid-to-gas phase propellant in causing dispersal of clouds and fogs is unknown to me and I do not wish to be bound by the following explanation, it may be that the general similarity between alcohol and water, as evidenced by the extraordinary affinity alcohol has for water and its complete miscibility in it, together with the cooling effect provided by the rapid boiling of the low boiling point liquid phase and its rapid expansion to the gas phase, affects water drop formation in cloud or fog and so may produce a coalescing of the water droplets or vapor and so reduce their surface tension as to result in dissipation thereof, or to form drops large enough to fall as rain.

It is a particular feature of my invention that extraordinarily small quantities of alcohol-containing liquid propellant may be used to disperse or precipitate warm clouds or fogs over relatively large areas.

For the purpose of more fully explaining the method of my invention, reference is made to the drawing showing a preferred embodiment of apparatus for carrying it out.

Referring to the drawing, the apparatus is shown as a conventional cylindrical pressure container 2 having a suitable valve 4. The outlet line 6 at its inner end preferably extends nearly to the bottom of said container, and at its other end is provided with a nozzle 8 having a relatively wide opening therein. An alcohol-containing liquid-to-gas phase propellant 12, preferably carbon dioxide having methyl alcohol or 95% ethyl alcohol dissolved therein, is contained within said container which may be of a capacity of about 5 to 7 pounds of carbon dioxide or larger. In practice, only about 100 cc. of 95% ethyl alcohol, for example, is dissolved in about 5 pounds (about 2000 cc.) of carbon dioxide, about a 5% solution, although such percentage is not critical and may run from about 1% up to as high as about 10% or even higher. The vapor pressure of said carbon dioxide will, under usual conditions, be about 800 pounds per square inch at normal temperature (20° C.) thus providing a high degree of expansion and cooling when the solution is released by valve 4 through nozzle 8, the vapor pressure of said carbon dioxide acting to force the solution upward through outlet line 6 and nozzle 8 to provide for suitably dispersing the ethyl alcohol together with the carbon dioxide into the atmosphere.

The above described apparatus when used to produce a trail of dispersed alcohol through an atmospheric cloud, as by using an aircraft, produces an expanding hole therethrough which the aircraft has passed. Very often the cloud dissipates to some extent and usually completely. Ground dispersal of a small quantity of alcohol either methyl or ethyl, from a solution of a low boiling point liquid-to-gas phase propellant over an extended area without regard to the nature of the terrain, as from a pressure container carried by a moving vehicle, has also been practiced, and is effective to disperse warm fogs in many instances. It is, however, not meant to imply that visible success to the desired degree is inevitable, although long and extensive testing has demonstrated the utility of my novel method in actual practice.

As a typical example of the practice of my invention, an experiment was carried out from an aircraft in the vicinity of Houston, Texas, between 12:30 and 3.30 p.m. In such experiment a solution of about 100 cc. of 95% ethyl alcohol in about 5 pounds of carbon dioxide contained in a conventional 5 to 7 pound pressure cylinder was used. At the time there were long lines of fractocumulus clouds with their bases at about 3500 feet, and such clouds were increasing and their vertical activity could be plainly seen. The ambient air temperature was well above 0° C., being 16° C. When a dispersed trail of ethyl alcohol from the pressurized solution thereof in carbon dioxide was made along such clouds, complete dissipation of the clouds took place in less than two minutes, and thirty minutes after the experiment was begun, an area roughly twenty miles in diameter was completely free of clouds, but a single charge of solution in such pressure container having been used.

A second experiment was later carried out in the same locality between about 10:30 a.m. and 12:30 p.m. during which experiment stratus clouds with bases at about 5000 feet were dissipated by introducing ethyl alcohol in dispersed form from a pressurized carbon dioxide solution as before, and such dispersion took place within a few minutes. The ambient air temperature at the time was about 15° C.

In applying the novel method of my invention to fog dispersal, it is preferable to disperse an extended trail from a pressure cylinder carried on a moving vehicle throughout the area in which the fog is to be dispersed or somewhat to windward thereof. Under such conditions, fog dispersal generally follows within a few minutes and frequently results in subsequent rain after the dispersal of the fog.

As an example of fog dispersal, an experiment was carried out in Melrose, Massachusetts, beginning about 1:30 p.m. The area selected was wooded and rolling and several miles in diameter, and light rain was falling through the fog from an overcast about 600 feet above the ground, the temperature being about 15° C. The pressure container used had about 100 cc. of 95% ethyl alcohol put into it and had been charged with about 5 pounds of carbon dioxide to its about 5 to 7 pound capacity. After seven minutes of dispersing the ethyl alcohol and carbon dioxide from the pressure container at a stationary site, a rather dense fog appeared some 100 yards to leeward of the dispersion from said site, and after ten minutes such dense fog disappeared leaving a relatively clear elliptical area perhaps a half mile in length. At the same time, the overcast ceiling above became visible. After the container had emptied, in about 17 minutes, the area began to fill with fog and was filled in within about 18 minutes from the time the container emptied. The experiment was reapeated about 1½ hours later with similar results.

As another example of the practice of my invention, when a bullet with a quantity of ethyl alcohol in a reservoir therein is fired at and into an atomspheric cloud, such cloud often shows an expanding hole therethrough through which the bullet has passed. Very often the cloud dissipates to some extent and usually completely if it is a cumulus cloud. If such cloud happens to be over a mountain or a spot where cumulus clouds normally form, a few hours after said dissipation a new one may appear and reach the cumulonimbus state. Ground dispersal of a few ounces of methyl or ethyl alcohol over an extended area without regard to the nature of the terrain, as from an atomizer carried by a moving vehicle, has also been practiced.

As a typical example of the practice of the method of my invention an experiment was carried out at Tenguel, Ecuador, about 50 miles south of Guayaquil. The Humboldt Current causes a great bank of stratus clouds to hang over this area and to the south for about 8 months ever year. This bank comes down to a few hundred feet of the ground and goes up to about 4000 feet but during this time of year rarely if ever does anything more than mist result. Between 8:00 and 8:30 a.m. 20–220 grain 30–06 bullets were shot straight up. Each bullet contained roughly $\frac{1}{10}$ of a cc. of ethyl alcohol. 2 ccs. in all were used. At 8:35 a.m. a hole showing blue sky appeared where the shots were fired. At 9:15 a.m. it became very dark and a gentle rain began to fall and lasted until 11:20 a.m.

As an additional example of fog dispersal according to my invention, at Houston, Texas, Municipal Airport, an experiment was carried out after the Weather Bureau at the airport advised at 4:30 a.m. that the airport was closed because of fog and could not be expected to open much before 9:00 or 10:00 a.m. Beginning at obout 6:30 a.m., 6 oz. of ethyl alcohol were atomized from an atomizer carried on a car driven around a rectangle to the southwest of the airport building where there is a parking lot for the airport which perhaps comprises 5 acres. The atomizing began at 6:37 and ended at 7:05 a.m. Three trips were made around the rectangle during this period and on the third time around cars were visible in the lot and shortly thereafter visibility improved markedly, an opening to blue sky was noted and at 7:20 a.m. the airport was opened for services. This hour was considered much too early for the fog to have burned away naturally.

Thus, it may be seen that I have provided an amazingly simple, ridiculously inexpensive, but nevertheless extraordinarily effective mthod for dissipating clouds and fogs from atmospheric air masses and one which for the first time may be carried out without regard to cloud or fog temperatures. Thus my invention vastly extends the conditions under which cloud and fog dispersal may be carried out. For example, the use of coastal airports by aircraft is now greatly facilitated, since I have made it possible to dissipate the usual warm fogs from the vicinity of the airport and open such airport to traffic. The operation of my invention is particularly surprising in view of the effectiveness of the relatively minute quantities of ethyl alcohol with which my invention may be carried out, and the ease and variety of means by which it may be dispersed. For example, a heater for evaporating the alcohol and causing its vapor to rise into the atmosphere has also proved to be effective. Various lower alcohols, too, are effective, such as for example, methyl, ethyl, propyl, isoamyl or tertiary butyl.

It will be apparent to those skilled in this art that various means and methods other than those therein enumerated may be employed within the spirit of my invention and the scope of the appended claims in introducing alcohol into a mass of atmospheric air containing water to affect water drop formation to disperse fogs and clouds and cause rain according to my invention.

I claim:

1. The method of dispersing natural atmospheric fogs and clouds comprising a mass of water droplets which method comprises introducing into said mass an alcohol selected from the group consisting of ethyl alcohol, methyl alcohol, propyl alcohol, isoamyl alcohol and tertiary butyl alcohol in dispersed form from a pressurized dispersion thereof in a low boiling point liquid-to-gas phase fluid as a propellant.

2. The method as claimed in claim 1 in which said liquid-to-gas phase fluid has a boiling point less than the ambient atmospheric temperature.

3. The method as claimed in claim 1 in which said liquid-to-gas phase fluid has an absolute saturated vapor pressure greater than the ambient atmospheric pressure at the ambient atmospheric temperature.

4. The method of dispersing natural atmospheric fogs and clouds comprising a mass of water droplets which method comprises introducing into said mass an alcohol selected from the group consisting of ethyl alcohol, methyl alcohol, propyl alcohol, isoamyl alcohol and tertiary butyl alcohol in dispersed form from a pressurized solution thereof in the liquid phase of a low boiling point liquid-to-gas phase fluid as a propellant.

5. The method of producing rain from a natural atmospheric cloud comprising a mass of water droplets which method includes introducing into said cloud alcohol selected from the group consisting of ethyl alcohol, methyl alcohol, propyl alcohol, isoamyl alcohol and tertiary butyl alcohol whereby water drops are formed and are precipitated as rain in the atmosphere underneath said cloud.

6. The method of dispersing clouds and fogs comprising a mass of water droplets which method includes introducing thereinto alcohol selected from the group consisting of ethyl alcohol, methyl alcohol, propyl alcohol, isoamyl alcohol and tertiary butyl alcohol in dispersed form.

References Cited in the file of this patent

UNITED STATES PATENTS

| | | |
|---|---|---|
| 462,795 | Gathman | Nov. 10, 1891 |
| 2,059,969 | Mapes | Nov. 3, 1936 |
| 2,570,226 | Geiringer | Oct. 9, 1951 |
| 2,570,867 | Schaefer | Oct. 9, 1951 |

OTHER REFERENCES

"Rain Making and Other Weather Vagaries," by Humphreys, pages 53, 54, 73, 74 and 75.